US007563308B2

(12) United States Patent
Tempel et al.

(10) Patent No.: US 7,563,308 B2
(45) Date of Patent: *Jul. 21, 2009

(54) IONIC LIQUID BASED MIXTURES FOR GAS STORAGE AND DELIVERY

(75) Inventors: Daniel Joseph Tempel, Macungie, PA (US); Philip Bruce Henderson, Allentown, PA (US); Jeffrey Richard Brzozowski, Kunkletown, PA (US); Ronald Martin Pearlstein, Macungie, PA (US); Diwakar Garg, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/208,723

(22) Filed: Aug. 23, 2005

(65) Prior Publication Data

US 2006/0060818 A1    Mar. 23, 2006

Related U.S. Application Data

(63) Continuation-in-part of application No. 10/948,277, filed on Sep. 23, 2004.

(51) Int. Cl.
*B01D 19/00* (2006.01)
*F17C 11/00* (2006.01)
(52) U.S. Cl. .................... 95/241; 252/183.11
(58) Field of Classification Search .............. 95/46, 95/149, 156, 241, 266; 252/183.11, 181.3; 423/210; 206/0.6, 0.7; 222/3
See application file for complete search history.

(56) References Cited

U.S. PATENT DOCUMENTS

| 4,668,255 | A | 5/1987 | Govind |
| 4,713,091 | A | 12/1987 | Govind |
| 4,744,221 | A | 5/1988 | Knollmueller |
| 4,761,164 | A * | 8/1988 | Pez et al. .............. 95/44 |
| 5,220,106 | A | 6/1993 | Boate et al. |
| 5,518,528 | A | 5/1996 | Tom et al. |
| 5,704,965 | A | 1/1998 | Tom et al. |
| 5,837,027 | A | 11/1998 | Olander et al. |
| 5,858,067 | A | 1/1999 | McManus |
| 5,917,140 | A | 6/1999 | Tom |
| 5,993,766 | A | 11/1999 | Tom et al. |
| 6,019,823 | A | 2/2000 | Tischler et al. |
| 6,027,547 | A | 2/2000 | Tom et al. |
| 6,277,342 | B1 | 8/2001 | Pearlstein et al. |
| 6,309,446 | B1 | 10/2001 | Nakanoya et al. |
| 6,320,083 | B1 | 11/2001 | Saleh |
| 6,339,182 | B1 | 1/2002 | Munson et al. |
| 6,579,343 | B2 | 6/2003 | Brennecke et al. |
| 6,623,659 | B2 | 9/2003 | Munson et al. |
| 7,172,646 | B2 * | 2/2007 | Tempel et al. ......... 95/241 |
| 2003/0085156 | A1 | 5/2003 | Schoonover |
| 2003/0125599 | A1 | 7/2003 | Boudreau et al. |
| 2004/0035293 | A1 * | 2/2004 | Davis, Jr. .............. 95/140 |
| 2004/0206241 | A1 | 10/2004 | Tempel et al. |

FOREIGN PATENT DOCUMENTS

| EP | 1 486 458 A | 12/2004 |
| JP | 2006-036950 A | 2/2006 |
| WO | WO 00/20115 | 4/2000 |
| WO | WO 0140150 | 6/2001 |
| WO | WO 02/11860 | 2/2002 |
| WO | WO 0226701 | 4/2002 |
| WO | WO 02/34863 | 5/2002 |
| WO | WO 03/086605 | 10/2003 |
| WO | WO 2005/009897 A | 2/2005 |

OTHER PUBLICATIONS

Zhang, et al. "Solubility of CO2 in Sulfonate Ionic Liquids at High Pressure," J. Chem. Eng. Data, vol. 50, Jan. 2005, pp. 230-233.
Welton, T., "Room-Temperature Ionic Liquids. Solvents for Synthesis and Catalysis", Chem. Rev. 1999, 99, 2071-2083.
Dupont, J. et al., "Room Temperature Molten Salts: Neoteric "Green" Solvents for Chemical Reactions and Processes", J. Braz. Chem. Soc. 2000, 11, 337-344.
Sheldon, R., "Catalytic Reactions in Ionic Liquids", Chem. Commun. 2001, 2399-2407.
Brauer, David J., et al., "Phosphines with 2-Imidazolium and para-Phenyl2-2-Imidazolium Moieties—Synthesis and Application in Two-Phase Catalysis", Journal of Organometallic Chemistry 630 (2001), 177-184.
Bates, Eleanor D., et al., "$CO_2$ Capture by a Task-Specific Ionic Liquid", Chem. Soc. 2002, 124, 926-927.
Cole, Amanda C., "Novel BrØnsted Acidic ionic Liquids and Their Use as Dual Solvent—Catalysts", J. Am. Chem. Soc. 2002, 124, 5962-5963.
"SDS1 Phosphine Safe Delivery Source", product literature, Matheson Tri-Gas, 1997.
"SDS2 Phosphine Safe Delivery Source", product literature, Matheson Tri-Gas, 1997.
Chevrier, Peter, et al., "Complex-Fluoroanions in Solution-X Complexes of Phosphorus and Arsenic Fluorides with Simple Anions", J. Inorg. Nucl. Chem., vol. 42, pp. 1397-1405, Jan. 1980.
Brownstein, et al., "Complex Fluoroanions in Solution. IX. $BF_3$-Anion Complexes and Their Disproportionation", Can. J. Chem., 56, 2764 (1978), pp. 2764-2767.

(Continued)

*Primary Examiner*—Frank M Lawrence
(74) *Attorney, Agent, or Firm*—Rosaleen P. Morris-Oskanian

(57) ABSTRACT

A mixture and method for the storage and delivery of a gas are disclosed herein. In one aspect, there is provided a mixture comprising: an ionic liquid comprising an anion and a cation, at least a portion of the gas that is disposed within and reversibly chemically reacted with the ionic liquid, and optionally an unreacted gas. In another aspect, there is provided a method for delivering a gas from a mixture comprising an ionic liquid and one or more gases comprising: reacting at least a portion of the gas with the ionic liquid to provide the mixture comprising a chemically reacted gas and an ionic liquid and separating the chemically reacted gas from the mixture wherein the chemically reacted gas after the separating step has substantially the same chemical identity as the chemically reacted gas prior to the reacting step.

22 Claims, 1 Drawing Sheet

OTHER PUBLICATIONS

Brownstein, S., et al., "Complex Fluoroanions in Solution. VIII. Mixed Anions Containing Fluoride and Trifluoromethanesulfonate or Fluorosulfate", Can. J. Chem. vol. 26, 1978, pp. 1419-1422.

Brownstein, S., et al., "Lewis Base Complexes of Tungsten and Molybdenum Hexafluorides", Canadian Jorunal of Chemistry, vol. 54, 15, Aug. 1, 1976, pp. 2343-2348.

Brownstein, et al., "Complex Fluoroanions in Solution. XI. Complexes in Silicon, Germanium, and Titanium Tetrafluorides with Simple Anions", Can. J. Chem., vol. 58, 1980, pp. 1407-1411.

Brownstein, S., et al., "Complexes of Boron Trifluoride With Fluoborates", Canadian journal of Chemistry, vol. 43 (1965), pp. 1645-1649.

Brownstein, S., "Complexing, Exchange, and Redistribution Reactions of Some Group III and Group V Fluorides and Their Anions", Canadian Journal of Chemistry, vol. 47, 1969, pp. 605-609.

Brownstein, S., "Complex Fluoro Anions in Solution I. Homo- and Hetropolyfluoro Anions of Niobium an Tantalum", Inorganic Chemistry, vol. 12, No. 3, 1973, pp. 584-589.

Cyr, T., et al., "Complexes of $BrF_3$ With $BF_3$, $PF_h$ and $AsF_5$", Journal Nucl. Chem., 1977, vol. 39, pp. 2143-2145.

Brownstein, S., "Complex Fluoroanions in Solution—III Disproportionation and Complexing of $WF_6$", J. Inorg. Nucl. Chem., 1973, vol. 35, pp. 3575-3579.

Brownstein, S., "Complex Fluoroanions in Solution—II Reactions of Boron Trifluoride and Phosphorus Pentafluoride with Group VB Hexafluoroanions", J. Inorg. Nucl. Chem., 1973, vol. 35, pp. 3567-3574.

Burchill, P., "Some Reactions of Triphenylmethyl Compounds with Boron Fluoride", Canadian Journal of Chemistry, vol. 45, 17 (1967), pp. 17-20.

Brownstein, S., et al., "Complex Fluoroanions in Solution. V. Vandium Pentafluoride", Can. J. Chem. 52, 2236 (1974), pp. 2236-2241.

* cited by examiner

IONIC LIQUID BASED MIXTURES FOR GAS STORAGE AND DELIVERY

CROSS-REFERENCE TO RELATED APPLICATIONS

This application is a continuation-in-part of U.S. patent application Ser. No. 10/948,277, filed 23 Sep. 2004, the disclosure of which is incorporated herein by reference in its entirety.

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine ($PH_3$), arsine ($AsH_3$), and boron trifluoride ($BF_3$) for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

In order to mitigate some of these safety issues associated with high pressure cylinders, on-site electrochemical generation of such gases has been used. Because of difficulties in the on-site synthesis of the gases, a more recent technique of low pressure storage and delivery systems has been to adsorb these gases onto a solid support. These storage and delivery systems are not without their problems. They suffer from poor capacity and delivery limitations, poor thermal conductivity, and so forth.

BRIEF SUMMARY OF THE INVENTION

A mixture for the storage and delivery of a gas and a method and system for making and using same are disclosed herein. In one aspect, there is provided a mixture for the storage and delivery of a gas comprising: an ionic liquid comprising an anion and a cation; and a gas disposed within the ionic liquid comprising one selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, and an oxygen-containing gas wherein at least a portion of the gas is reversibly chemically reacted with the ionic liquid. In certain embodiments, the mixture further comprises an unreacted gas or a gas that is not chemically reacted with the ionic liquid. In these embodiments, the unreacted gas may be selected from an inert gas, an additive gas, the unreacted portion of the chemically reactive gas, and mixtures thereof.

In another aspect, there is provided a method for the storage and delivery of a gas comprising: providing an ionic liquid comprising an anion and a cation; contacting the gas with the ionic liquid under conditions sufficient to provide a mixture wherein at least a portion of the gas is chemically reacted with the ionic liquid; and separating at least a portion of the gas from the ionic liquid. The chemical identity of the gas after the separating step is substantially the same as the gas prior to the contacting step. The gas disposed within the ionic liquid may comprise one selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a carbonyl-containing gas, an oxygen-containing gas, and mixtures thereof.

In a further aspect, there is provided a mixture for storage and delivery of a gas comprising: an ionic liquid having Lewis basicity and comprising an anion selected from $BF_4^-$, p-$CH_3$—$C_6H_4SO_3^-$, $CF_3SO_3^-$, $(CF_3SO_2)_2N^-$, $(NC)_2N^-$, $(CF_3SO_2)_3C^-$, $CH_3COO^-$ and $CF_3COO^-$ and a cation selected from tetraalkylphosphonium, teraalkylammonium, N-alkylpyridinium, and 1,3-dialkylimidazolium; the gas wherein at least a portion of the gas is reversibly chemically reacted with the ionic liquid to provide a chemically reacted gas wherein the chemically reacted gas has Lewis acidity and is selected from diborane, boron trifluoride, boron trichloride, phosphorous trifluoride, phosphorous tetrafluoride, silicon tetrafluoride, germane, germanium tetrafluoride, hydrogen cyanide, isotopically-enriched analogs, and mixtures thereof; and optionally an unreacted gas.

In a still further aspect, there is provided method for the storage and delivery of a gas selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, an oxygen-containing gas and mixtures thereof comprising the steps of: providing an ionic liquid comprising an anion and a cation; reacting at least a portion of the gas with the ionic liquid to provide a mixture comprising an ionic liquid and a chemically reacted gas; introducing an unreacted gas comprising an inert gas into the mixture; and separating at least a portion of the chemically reacted gas and optionally the unreacted gas from the mixture where the gas after the separating step has substantially the same chemical identity as the chemically reacted gas prior to the reacting step.

In yet another aspect, there is provided a method method for the removal of at least a portion of an unreacted gas from a mixture comprising a chemically reacted gas, an ionic liquid, and the unreacted gas comprising: providing the ionic liquid comprising an anion and a cation within a storage vessel; introducing the unreacted gas to the storage vessel comprising the ionic liquid wherein at least a portion of the unreacted gas resides within a headspace of the storage vessel; reacting at least a portion of a gas selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, an oxygen-containing gas and mixtures thereof with the ionic liquid to provide the mixture comprising the ionic liquid, a chemically reacted gas disposed within the ionic liquid, and the unreacted gas; reducing the temperature of the mixture to solidify the ionic liquid and provide a solidified mixture comprising the ionic liquid and chemically reacted gas wherein the reducing decreases the solubility of the unreacted gas thereby causing the unreacted gas to evolve into the headspace; removing substantially all of the unreacted gas from the headspace; and increasing the temperature of solidified mixture to provide a mixture substantially free of unreacted gas.

DETAILED DESCRIPTION OF THE INVENTION

Figure 1:
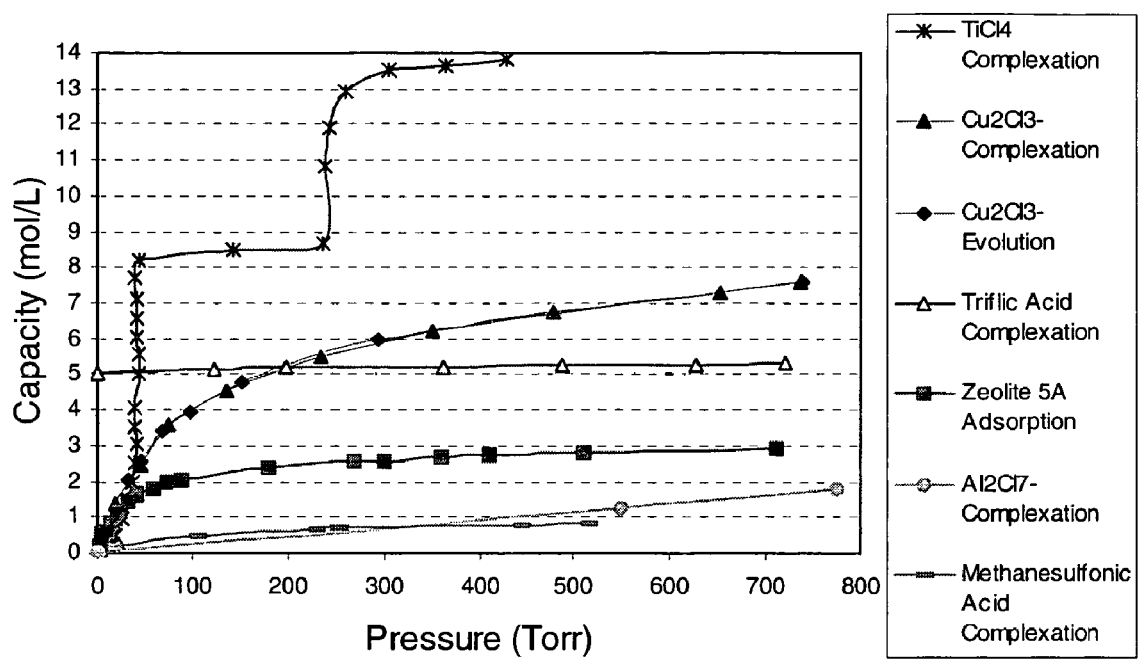
FIG. 1 is a graph of capacity of phosphine ($PH_3$) for a number of different reactive liquids, ionic liquids and a solid adsorbent.

Relatively few examples of mixtures that result from a chemical reaction between an ionic liquid and another compound such as one or more gases exist to date. In most instances, ionic liquids act as solvents and do not undergo a chemical reaction with the at least a portion of the gas contained therein. The mixture described herein comprises an ionic liquid and one or more gases wherein the ionic liquid is chemically reacted with at least a portion of the gas disposed therein. The chemical reaction between the ionic liquid and at least a portion of the gas is reversible; in other words, the chemical identity of at least the portion of the gas within the mixture that is reacted with the ionic liquid, upon separation from the ionic liquid, is substantially the same as it was prior to addition to the mixture. The gas or gases may then be separated from the mixture when needed. It is believed that these mixtures broaden the use of ionic liquids for a variety of applications including, but not limited to, extraction, separation, and other applications. In one particular embodiment, the mixture may be used for the storage and delivery of one or more gases to a point of use. For example, the mixture may contain a gas that is used, for example, as a reagent for an ion implant process or in a vapor deposition process such as atomic layer deposition or chemical vapor deposition.

In certain embodiments, the mixture may optionally comprise an unreacted gas The term "unreacted gas" as used herein describes one or more gases that are not chemically reacted with the ionic liquid. The unreacted gas may be disposed within the ionic liquid as a result of intermolecular forces such as, without limitation, van der Waals forces or hydrogen bonding, disposed within the headspace of the vessel, or both. The unreacted gas may comprise an additive gas or gases, an inert gas or gases, the unreacted portion of the chemically reacted gas, and mixtures thereof. In certain instances, the unreacted gas may be considered an additive gas as defined herein whereas in other circumstances, the unreacted gas may be considered an inert gas as defined herein. Certain gases which are identified herein as an additive gas may be also identified herein as an inert gas depending upon, but without limitation, temperature, pressure, the identity of the chemically reacted gas, the identity of the ionic liquid, and other factors. In embodiments wherein the unreacted gas comprises an additive gas, the term "additive gas" describes a gas or gases that exhibit a different chemical reactivity with the ionic liquid than the chemically reacted gas. For example, the additive gas could be chemically reacted with the ionic liquid if the conditions (e.g., temperature, pressure, etc.) changed. In these embodiments, the additive gas could become a chemically reacted gas upon a change in conditions such as the removal of at least a portion of the chemically reacted gas from the mixture. Particular examples of additive gases include, but are not limited to, carbon monoxide, carbon dioxide, oxygen, nitrogen, and mixtures thereof. In other embodiments wherein the unreacted gas comprises an inert gas, the term "inert gas" describes a gas or gases that are non-reactive to the ionic liquid and/or the portion of the gas that is chemically reacted with the ionic liquid. Examples of inert gases include, but are not limited to, nitrogen, helium, hydrogen, argon, xenon, krypton, radon, and mixtures thereof. One particular example of this embodiment is a mixture comprising an ionic liquid, $PH_3$ and nitrogen wherein at least a portion of the $PH_3$ is chemically reacted with the ionic liquid and nitrogen is an unreacted inert gas. In still further embodiments, the mixture can comprise the unreacted portion of the gas that is chemically reacted with the ionic liquid. In these embodiments, only a portion of the gas chemically reacts with the ionic liquid to form the mixture described herein thereby leaving an unreacted portion at a particular pressure, temperature, and/or other condition. One particular example of this embodiment is a mixture comprising an ionic liquid, $PH_3$ that is reacted with the ionic liquid, and $PH_3$ that is dissolved within but is not reacted with the ionic liquid.

The term "chemical reaction" as used herein describes a chemical interaction involving intramolecular valence forces (e.g., covalent, dative covalent, coordinate, or electrovalent) between the ionic liquid and at least a portion of the gas disposed therein. In certain embodiments, the chemical reaction between the ionic liquid and at least a portion of the gas may occur with at least one mole or greater of gas to one mole of ionic liquid. In alternative embodiments, the molar ratio of reacted gas to ionic liquid is substantially 1:1. It is believed that at least one of the following phenomena has occurred to indicate that the chemical reaction to provide the mixture described herein has occurred: the phenomena can be characterized by chemical specificity; changes in the electronic state may be detected by one or more analytical methods (e.g., ultraviolet, infrared, microwave, or nuclear magnetic resonance (NMR) spectroscopy; electrical conductive, or magnetic susceptibility); the reaction may incur or release a certain amount of energy; and/or the elementary step upon reaction involves an activation energy. Examples of chemical reactions that may occur between the ionic liquid and the gas include, but are not limited to, Lewis acid/Lewis base reactions (e.g., coordination and Brønsted acid/base reactions), metallic substitution reactions, and metallic oxidative addition reactions. The following are non-limiting examples of various chemical reactions that provide the mixtures described herein.

Lewis Acid/Base Reactions:

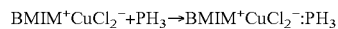

BMIM$^+$CuCl$_2^-$+PH$_3$→BMIM$^+$CuCl$_2^-$:PH$_3$

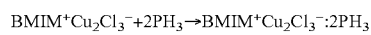

BMIM$^+$Cu$_2$Cl$_3^-$+2PH$_3$→BMIM$^+$Cu$_2$Cl$_3^-$:2PH$_3$

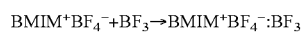

BMIM$^+$BF$_4^-$+BF$_3$→BMIM$^+$BF$_4^-$:BF$_3$

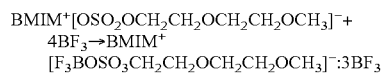

BMIM$^+$[OSO$_2$OCH$_2$CH$_2$OCH$_2$CH$_2$OCH$_3$]$^-$+
4BF$_3$→BMIM$^+$
[F$_3$BOSO$_3$CH$_2$CH$_2$OCH$_2$CH$_2$OCH$_3$]$^-$:3BF$_3$

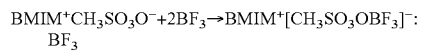

BMIM$^+$CH$_3$SO$_3$O$^-$+2BF$_3$→BMIM$^+$[CH$_3$SO$_3$OBF$_3$]$^-$:
BF$_3$

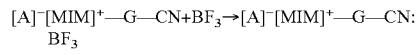

[A]$^-$[MIM]$^+$—G—CN+BF$_3$→[A]$^-$[MIM]$^+$—G—CN:
BF$_3$

[RMIM]⁺[A]⁻—G—OCH₃+MX_n→[RMIM]⁺[A]⁻—G—O(MX_n)CH₃

[RMIM]⁺[ML_n]⁻+L'→[RMIM]⁺[ML_n(L')]⁻

Brøonsted Acid/Base Reactions:

[A]⁻[MIM]⁺—G—NH₂+HX→[A]⁻[MIM]⁺—G—NH₃⁺X⁻

[A]⁻[MIM]⁺—G—SO₃H+Z→[A⁻][MIM]⁻—G—SO₃⁻ZH⁺

[RMIM]⁺[A]⁻—G—NH₂+HX→[RMIM]⁺[A]⁻—G—NH₃⁺X⁻

Metallic Substitution Reactions:

[RMIM]⁺[MX_n]⁻+X'Y→[RMIM]⁺[MX_{n-1}X']⁻+XY

[RMIM]⁺[ML_n]⁻+L'→[RMIM]⁺[ML_{n-1}(L')]⁻+L

Metallic Oxidative Addition Reactions:

[A]⁻[MIM]⁺—G—ML_n+XY→[A]⁻[MIM]⁺—G—ML_n(X)(Y)

[RMIM]⁺[ML_n]⁻+XY→[RMIM]⁺[ML_n(X)(Y)]⁻

[RMIM]⁺[ML_n]⁻+XY→[RMIM]⁺[ML_{n-1}(X)(Y)]⁻+L

In the above reactions, and throughout the specification, the variables are described as follows: "A" designates an anion of an ionic liquid; "Y" designates a cation; "BMIM" denotes 1-butyl-3-methylimidazolium; "MIM" denotes a substituted methylimidazolium with a group designated "G" denoting a hydrocarbyl group linking an imidazolium ring with a functional group such as, for example, $NH_2$, $NR_2$, $SO_3H$, $CN$, and $OCH_3$; "X" designates an anion in a compound which is not an ionic liquid which may include, but is not limited to, a halide atom; "Z" denotes a base; "L" and "L'" designate a dative covalent ligand; "M" denotes a metal atom; "R" is an alkyl group; and n is a number ranging from 1 to 8. The term "alkyl" as used herein includes linear, branched, or cyclic alkyl groups, containing from 1 to 24 carbon atoms, or from 1 to 12 carbon atoms, or from 1 to 5 carbon atoms. This term applies also to alkyl moieties contained in other groups such as haloalkyl, alkaryl, or aralkyl. The term "alkyl" further applies to alkyl moieties that are substituted, for example, with carbonyl functionality. In the above chemical formulas and in all chemical formulas throughout this document, it is understood that the variables such as R and X are not only independently selected relative to other R and X groups bearing different superscripts, but are also independently selected relative to any additional species of the same R or X group.

For most of the applications envisioned for the mixtures disclosed herein, the chemical reaction between the ionic liquid and at least a portion of the gas to provide the mixture should have a Gibb's free energy ($\Delta G_{rxn}$) of less than +1.3 kcal/mol ($K_{eq}$~0.1), which corresponds to at least 10% utilization of ionic liquid reactive sites at 25° C. and 760 Torr. In certain embodiments, the $\Delta G_{rxn}$ for the chemical reaction between the ionic liquid and at least a portion of the gas is equal to or less than about −0.5 kcal/mol for a temperature encompassing the liquidous range of the ionic liquid.

In certain preferred embodiments, the operable temperature range for the chemical reaction between the ionic liquid and at least a portion of the gas contained therein may range from the melting point of the one or more gases disposed therein to the decomposition temperature of the ionic liquid, or from about −100° C. to about 120° C., or from about 0° C. to about 50° C. The chemical reaction can occur with an amount of the gas ranging from at least a portion of the gas contained therein to substantially all of the gas contained therein. However, in embodiments wherein at least a portion of the gas is dissolved in another non-reactive liquid, the operable temperature may be less than the melting point of the gas(es) contained therein. The ionic liquid may be in a liquid phase prior to, during, and/or after the chemical reaction with at least a portion of the gas to provide the mixture. In one particular embodiment, the reaction may take place at room temperature wherein the ionic liquid is in the liquid phase and the reaction occurs upon introduction of the gas. In these embodiments, the gas may be compressed or at sub-ambient pressures. In another embodiment, the ionic liquid can be cooled to slow the rate of reaction, to control the rate of heat evolution, and/or to accommodate the transfer of at least a portion of the gas. In yet another embodiment, heat can be added to melt the ionic liquid, to increase the rate of reaction, and/or to accommodate transfer of one or more gases. In still a further embodiment, one or more gases can be supplied in a liquid phase solution which is then contacted with the ionic liquid. In yet other embodiments, the chemical reaction occurs when the ionic liquid is in the solid state, or as a liquid deposited upon at least a portion of a reactive or non-reactive solid support such as a porous member, or as an ionic liquid dissolved in another reactive or non-reactive fluid. In all of these embodiments, the resulting mixture may be a liquid, a crystalline solid, a glassy solid, or a mixture thereof.

As mentioned previously, the mixture, which is the product of the chemical reaction of an ionic liquid and at least a portion of the gas disposed therein, may be used to store and dispense one or more gases to a point of use. The term "gas" as used herein relates to one or more compounds having a vapor pressure of greater than 760 Torr at a temperature of about 35° C. The term "gas" also encompasses one or more gases that are delivered directly to the chemical reaction with the ionic liquid or "neat" or, alternatively, delivered as a vaporized liquid, a sublimed solid and/or transported by a non-reactive liquid or gas such as, for example, an additive gas or an inert gas, into direct contact with the ionic liquid.

The portion of the gas that is chemically reacted with the ionic liquid can be viewed in terms of capacity. The term "total capacity", as referred to herein, is defined as the number of moles of at least a portion of the gas that will react with one liter of the ionic liquid at a given temperature and pressure to provide the mixture. The term "working capacity ($C_w$)", as referred to herein, is defined as the number of moles of gas that is chemically reacted per liter of ionic liquid which is initially stored and is subsequently removable from the liquid during the dispensing operation. In certain embodiments, the temperature and pressure range for the dispensing operation, i.e., the separation of the gas from the mixture, may be a temperature ranging from 0 to 50° C. and a pressure ranging from 20 to 760 Torr. Working capacity can be determined by using the following equation (1):

$$C_w = ([\text{moles of chemically reacted gas within the mixture}] - [\text{moles of chemically reacted gas remaining in mixture after delivery}])/(\text{liters of ionic liquid}) \quad \text{(Equation 1)}$$

The chemical reaction between the at least a portion of the gas and the ionic liquid is reversible and the term "percent reversibility" describes the percentage of the gas that is initially reacted with the ionic liquid and subsequently removable from the mixture by a variety of means for a given pressure range. Percent reversibility can be determined by using the following equation (2):

% Reversibility=([moles of chemically reacted gas within the mixture]−[moles of chemically reacted gas remaining in mixture after delivery])/(moles
of initially reacted gas)]*100   (Equation 2)

In certain embodiments, the pressure range is from 20 to 760 Torr and the percent reversibility is at least 15% or greater, at least 35% or greater, or at least 65% or greater.

One of the difficulties in the development of a suitable storage and delivery system is the matching of a suitable ionic liquid with one or more gases through prediction of the $\Delta G_{rxn}$. To minimize experimentation and project the viability of possible systems, quantum mechanical methods can be used to predict molecular structures. Density Functional Theory (DFT) is a popular ab initio method that can be used to determine a theoretical value for the change in electronic energy for a given reaction ($\Delta E_{rxn}$=sum of $E_{products}$–sum of $E_{reactants}$) between the ionic liquid and at least a portion of the gas. The following is a discussion for this determination. The calculations are assumed to have an error of approximately ±3 kcal/mol.

In one particular embodiment, the mixture comprises the gas phosphine ($PH_3$). The reaction of one molar equivalent of $PH_3$ gas with one molar equivalent of an ionic liquid [IL] in the liquid phase to provide a mixture is represented by the equation 3:

$$IL + PH_3(g) \leftrightarrow IL\text{-}PH_3 \quad \text{(Equation 3)}$$

$$K_{eq} = [IL\text{-}PH_3]/[IL][PH_3] \quad \text{(Equation 4)}$$

The equilibrium constant for this reaction, $K_{eq}$, is described by equation 4, where the concentration of $PH_3$, $[PH_3]$, is in units of atmospheres. $K_{eq}$ is dependent upon the change in Gibbs free energy for the reaction, $\Delta G_{rxn}$, which is a measure of the binding affinity between $PH_3$ and A. The relationships between $\Delta G$, K, and temperature (in Kelvin) are given in equations 5 and 6.

$$\Delta G = \Delta H - T\Delta S \quad \text{(Equation 5)}$$

$$\Delta G = -RT \ln K \quad \text{(Equation 6)}$$

The value $\Delta E_{rxn}$ can be used as an approximate value for the change in enthalpy ($\Delta H$, see equation 5). Also, if it is assumed that the reaction entropy ($\Delta S$) is about the same for similar reactions, e.g., reversible reactions under the same temperature and pressure conditions, the values calculated for $\Delta E_{rxn}$ can be used to compare against $\Delta G_{rxn}$ for those reactions on a relative basis, i.e., $\Delta G_{rxn}$ is approximately proportional to $\Delta E_{rxn}$. Thus, the values calculated for $\Delta E_{rxn}$ can be used to help predict ionic liquids having the appropriate reactivity for a given gas. In the above illustration, it assumed that substantially all of the phosphine gas reacts with the ionic liquid.

It has been found that certain mixtures—wherein the ionic liquid and the one gas comprise a Lewis acid/base system or a Lewis base/acid system—can be established from the Gibbs free energy of reaction ($\Delta G_{rxn}$) for a given system. In a mixture having an ionic liquid and a gas with opposing Lewis acidity or basicity, the $\Delta G_{rxn}$ for storing and delivering the gas, and for the operable temperature and pressure, may range from about +1.3 to about –4.5 kcal/mole. There also exists an optimum $\Delta G_{rxn}$ for a given temperature and pressure range, which corresponds to a maximum working capacity for the liquid. In reference to the gas $PH_3$, if the magnitude of $\Delta G_{rxn}$ (and thus, $K_{eq}$) is too small, the ionic liquid will have insufficient capacity for $PH_3$. This insufficient capacity may be compensated for by selecting an ionic liquid with a higher concentration of $PH_3$ reactive groups. If the magnitude of $\Delta G_{rxn}$ (and thus, $K_{eq}$) is too large, an insufficient amount of $PH_3$ will be removable at the desired delivery temperature. For the reaction of $PH_3$ with an ionic liquid, IL, at 25° C. and in the pressure range 20 to 760 Torr, the optimum value range for $\Delta G_{rxn}$ is about from –0.5 to –1.6 kcal/mol. In certain mixtures for gas storage and delivery that involve the reaction of a single equivalent of gas with an ionic liquid having a single equivalent of Lewis acid/base group, the optimum $\Delta G_{rxn}$ will be about –1.1 kcal/mol at 25° C. and between 20 to 760 Torr. The situation, however, may be more complex for other mixtures, e.g., if the gas and ionic liquid react to provide a mixture that is a solid complex or if more than one molar equivalent of gas reacts with an ionic liquid having more than one molar equivalent of a Lewis acid/base group.

The term "ionic liquid" as used herein describes molten salts that are composed of anions and cations and which, as mentioned previously, have a molten phase below about 120° C. In certain embodiments, the ionic liquid may be represented by the empirical formula $A_xQ_y$, where A is a monoanion or polyanion, Q is a monocation or polycation, x is a number ranging from 1 to about 4, and y is a number ranging from 1 to about 4. The reactivity of the ionic liquid with the at least a portion of the gas may be determined by the character of the cation, the anion, or by the combination of the cation and anion. A wide variety of anions can be matched with the cation component of the ionic liquids. One example of an anion is a metal halide derivative, i.e., metal fluoride, metal bromide, metal chloride, and metal iodide. Exemplary metals for supplying the anion component may include copper, aluminum, iron, zinc, tin, antimony, titanium, niobium, tantalum, gallium, and indium. In embodiments wherein the metal halide anion is derived form a metal chloride, examples of metal chloride anions include, but are not limited to, $CuCl_2^-$, $Cu_2Cl_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $CrCl_4^-$, $TiCl_5$, $TiCl_6^{2-}$, $SnCl_5^-$, $SnCl_6^{2-}$, and $InCl_4^-$. Other classes of anions include carboxylates, fluorinated carboxylates, sulfonates, fluorinated sulfonates, sulfates, imides, borates, phosphates, antimonates, etc. Some examples of these anions include, but are not limited to, $BF_4^-$, $PF_6^-$, $SbF_6^-$, p-$CH_3$—$C_6H_4SO_3^-$, $CF_3SO_3^-$, $CH_3SO_4^-$, $CH_3CH_2SO_4^-$, $NO_3^-$, $(CF_3SO_2)_2N^-$, $(NC)_2N^-$, $(CF_3SO_2)_3C^-$, $CH_3COO^-$ and $CF_3COO^-$.

In certain embodiments, the ionic liquid may act as a Lewis acid or Lewis base (including a Brønsted acid or base), although other types of reactions may occur. In these embodiments and others, exemplary ionic liquids comprise salts of tetraalkylphosphonium, tetraalkylammonium, N-alkylpyridinium or 1,3-dialkylimidazolium cations. Common cations in the ionic liquid contain $C_{1-20}$ alkyl groups, including but not limited to, the ethyl, butyl and hexyl derivatives of 1-alkyl-3-methylimidazolium and N-alkylpyridinium. Still other cations include pyrrolidinium, pyridazinium, pyrimidinium, pyrazinium, pyrazolium, triazolium, thiazolium, oxazolium, guanidinium, and isouroniums.

In embodiments wherein the gas disposed within the mixture is phosphine or arsine and the ionic liquid is a Lewis acid, the anion component of the ionic liquid may be a chlorocuprate or chloroaluminate and the cation component may be derived from a 1,3-dialkylimidazolium salt.

In embodiments wherein the gas is a Lewis acidic gas, the anion, cation, or both anion and cation of the corresponding ionic liquid within the mixture can be Lewis basic. Examples of Lewis basic anions that comprise the Lewis basic ionic liquid include carboxylates, fluorinated carboxylates, sulfonates, fluorinated sulfonates, imides, borates, chloride, etc. Common anion forms include $BF_4^-$, $PF_6^-$, $AsF_6^-$, $SbF_6^-$, $CH_3COO^-$, $CF_3COO^-$, $CF_3SO_3^-$, p-$CH_3$—$C_6H_4SO_3^-$, $(CF_3SO_2)_2N^-$, $(NC)_2N^-$, $(CF_3SO_2)_3C^-$, chloride, and F(HF)$_n^-$. Other anions include organometallic compounds such as alkylaluminates, alkyl- or arylborates, as well as transition metal species. Preferred anions include BF$_4^-$, p-CH$_3$—C$_6$H$_4$SO$_3^-$, CF$_3$SO$_3^-$, (CF$_3$SO$_2$)$_2$N$^-$, (NC)$_2$N$^-$ (CF$_3$SO$_2$)$_3$C$^-$, CH$_3$COO$^-$ and CF$_3$COO$^-$. Ionic liquids comprising cations that contain Lewis basic groups may also be used in reference to storing gases having Lewis acidity. Examples of Lewis basic cations include those comprising rings with multiple heteroatoms.

In certain embodiments, the ionic liquid may be classified as "task-specific" or bear reactive functional groups on the cation and/or anion. Such ionic liquids can be prepared, for example, using functionalized cations and/or anions containing a Lewis base or Lewis acid functional group. Examples of task specific ionic liquids include aminoalkyl, such as aminopropyl; cyanoalkyl, such as cyanoethyl and cyanopropyl; ureidopropyl, and thioureido derivatives of the above cations. Specific examples of task-specific ionic liquids containing functionalized cations include salts of 1-alkyl-3-(3-aminopropyl)imidazolium, 1-methoxyethyl-3-methylimidazolium, 1-alkyl-3-(3-cyanopropyl)imidazolium, 1-alkyl-3-(3-ureidopropyl)imidazolium, 1-alkyl-3-(3-thioureidopropyl)imidazolium, 1-methyl-3-(3-oxobutyl)imidazolium, 1-alkyl-4-(2-diphenylphosphanylethyl)pyridinium, 1-alkyl-3-(3-sulfopropyl)imidazolium, and trialkyl-(3-sulfopropyl) phosphonium, and trialkyl(tetrahydrofuran-2-ylmethyl) phosphonium. Specific examples of task specific ionic liquids containing functionalized anions include salts of 2-(2-methoxyethoxy)ethyl sulfate, 2-aminoethanesulfonate and 2-acetylaminoethanesulfonate.

In still other embodiments, the ionic liquid may comprise a cation and/or anion that bear a chiral center. Such ionic liquids can be prepared, for example, using reaction precursors that contain at least one chiral center. Specific examples of ionic liquids containing chiral cations include salts of (S)-4-isopropyl-2-ethyl-3-methyl-4,5-dihydrooxazol-3-ium, (R)-4-isopropyl-2-ethyl-3-methyl-4,5-dihydrooxazol-3-ium, (S)-(1-hydroxymethylpropyl)trimethylammonium, and (R)-(1-hydroxymethylpropyl)trimethylammonium, (S)-4-ethyl-2-isopropyl-3-methyl-4,5-dihydrothiazol-3-ium, and (R)-4-ethyl-2-isopropyl-3-methyl-4,5-dihydrothiazol-3-ium. Specific examples of ionic liquids containing chiral anions include salts of (S)-lactate, (R)-lactate, (S)-camphorsulfonate, (R)-camphorsulfonate, (S)-butane-2-sulfonate, and (R)-butane-2-sulfonate. The chiral cation and/or anion may also bear a reactive functional group. In the above examples, (R) and (S) denote stereochemistry orientation.

As is known in the synthesis of halometallate ionic liquids, the type of metal halide and the amount of the metal halide employed has an effect on the Lewis acidity of the ionic liquid. For example, when aluminum trichloride is added to a chloride precursor, the resulting anion may be in the form AlCl$_4^-$ or Al$_2$Cl$_7^-$. The two anions derived from aluminum trichloride have different acidity characteristics, and these differing acidity characteristics impact on the type of gases that can be reactively stored.

In certain embodiments, the Lewis acidic or Lewis basic ionic liquids are prepared from one or more halide compounds. Examples of halide compounds from which Lewis acidic or Lewis basic ionic liquids can be prepared include: 1-ethyl-3-methylimidazolium bromide; 1-ethyl-3-methylimidazolium chloride; 1-butyl-3-methylimidazolium bromide; 1-butyl-3-methylimidazolium chloride; 1-hexyl-3-methylimidazolium bromide; 1-hexyl-3-methylimidazolium chloride; 1-methyl-3-octylimidazolium bromide; 1-methyl-3-octylimidazolium chloride; monomethylamine hydrochloride; trimethylamine hydrochloride; tetraethylammonium chloride; tetramethyl guanidine hydrochloride; N-methylpyridinium chloride; N-butyl-4-methylpyridinium bromide; N-butyl-4-methylpyridinium chloride; tetrabutylphosphonium chloride; and tetrabutylphosphonium bromide.

It is believed that through the proper choice of the anion component and/or the cation component, an ionic liquid can be selected for optimum reactivity with at least a portion of the gas. The following tables I and II provide non-limiting examples of mixtures described herein that include an ionic liquid and a gas which may be a Lewis acidic or a Lewis basic gas.

TABLE I

Exemplary Mixtures of Ionic Liquid and Gas wherein the gas is a Lewis Basic Gas

| Anion Components | Cation Components | Gas (Lewis Basic Gas) |
|---|---|---|
| Cu$_2$Cl$_3^-$ | 1-Butyl-3-methylimidazolium | PH$_3$ |
| CuCl$_2^-$ | 1-Hexyl-3-methylimidazolium | AsH$_3$ |
| Al$_2$Cl$_7^-$ | 1-Butyl-2,3-dimethylimidazolium | SbH$_3$ |
| FeCl$_4^-$ | N-Hexylpyridinium | NH$_3$ |
| FeCl$_3^-$ | 1-butyl-1-methylpyrrolidinium | H$_2$NCH$_3$ |
| ZnCl$_3^-$ | Trihexyl(tetradecyl)phosphonium | P(CH$_3$)$_3$ |
| CrCl$_4^-$ | Methyl(trioctyl)ammonium | H$_2$Se |
|  | Hexamethylguanidinium | (CH$_3$)$_2$O |
|  | 1-methyl-3-(3-sulfopropyl)imidazolium | COCl$_2$ |
|  | trioctyl-(3-sulfopropyl)phosphonium | CH$_2$(O)CH$_2$ |

TABLE II

Exemplary Mixtures of Ionic Liquid and Gas wherein the gas is a Lewis Acidic Gas

| Anion Components | Cation Components | Gas (Lewis Acidic Gas) |
|---|---|---|
| BF$_4^-$ | 1-Butyl-3-methylimidazolium | BF$_3$ |
| CF$_3$SO$_3^-$ | 1-Hexyl-3-methylimidazolium | B$_2$H$_6$ |
| FSO$_3^-$ | 1-Butyl-2,3-dimethylimidazolium | SiF$_4$ |
| Cl$^-$ | N-Hexylpyridinium | PF$_5$ |
| ClO$_4^-$ | 1-butyl-1-methylpyrrolidinium | AsF$_5$ |
| CH$_3$CO$_2^-$ | Trihexyl(tetradecyl)phosphonium | GeH$_4$ |
| (CF$_3$SO$_2$)$_2$N$^-$ | Methyl(trioctyl)ammonium | GeF$_4$ |
| B(CN)$_4^-$ | Hexamethylguanidinium | Ga$_2$H$_6$ |
| CH$_3$SO$_4^-$ | 1-alkyl-3-(3-cyanopropyl)imidazolium | SnH$_4$ |
| 2-(2-ethoxyethoxy)-ethylsulfate | 1-methoxyethyl-3-methylimidazolium | SF$_4$ |
| (S)-lactate | (S)-4-isopropyl-2-ethyl-3-methyl-4,5-dihydrooxazol-3-ium | WF$_6$ |

The following are non-limiting examples of gases wherein at least a portion of the gas may react with the ionic liquid to provide the mixture described herein or a component thereof:
boron-containing gas (e.g., B$_2$H$_6$, BH$_3$, BH$_2$R, BHR$_2$, B(CH$_3$)$_3$, BR$_3$, BF$_3$, BCl$_3$, BX$_3$, BXR$_2$, BX$_2$R,);
aluminum-containing gas (e.g., Al$_2$H$_6$, AlH$_3$, AlH$_2$R, AlHR$_2$, AlR$_3$);
phosphorous-containing gas (e.g., PH$_3$, PH$_2$R, PHR$_2$, P(CH$_3$)$_3$, PR$_3$, PF$_3$, PX$_3$, PF$_5$, PX$_5$, PXR$_2$, PX$_2$R,);
arsenic-containing gas (e.g., AsH$_3$, AsH$_2$R, AsHR$_2$, AsR$_3$, AsF$_5$, AsX$_5$, AsX$_3$, AsXR$_2$, AsX$_2$R,);
ether-containing gas (e.g., O(CH$_3$)$_2$, O(CH$_2$CH$_3$)$_2$, CH$_2$(O)CH$_2$ (ethylene oxide)), CH$_2$(O)CHCH$_3$ (propylene oxide), OR$_2$);
nitrogen-containing gas (e.g., N$_2$, NO, NO$_2$, N$_2$O, NOCl, NOX, NH$_3$, N(CH$_3$)$_3$, NR$_3$, NR$_2$H, NRH$_2$, HCN, ClCN, C$_2$N$_2$);
antimony-containing gas (e.g., SbH$_3$, SbH$_2$R, SbHR$_2$, SbR$_3$);

bismuth-containing gas (e.g., $BiH_3$, $BiH_2R$, $BiHR_2$, $BiR_3$);
selenium-containing gas (e.g., $SeH_2$, $SeHR$, $SeR_2$, $SeX_2$, $SeF_6$, $SeX_6$);
gallium-containing gas (e.g., $Ga_2H_6$, $GaH_3$, $GaH_2R$, $GaHR_2$, $GaR_3$);
silicon-containing gas (e.g., $SiH_4$, $Si(CH_3)_4$, $SiH_3R$, $SiH_2R_2$, $SiH_3R$, $SiR_4$, $SiF_4$, $SiCl_4$, $SiX_4$, $SiHX_3$, $SiH_2X_2$, $SiH_3X$, $SiXR_3$, $SiX_2R_2$, $SiX_3R$, $SiH_3(OR)$, $SiH_2(OR)_2$, $SiH(OR)_3$, $Si(OR)_4$, $SiR_3(OR)$, $SiR_2(OR)_2$, $SiR(OR)_3$, $SiX(OR)_3$, $SiX_2(OR)_2$, $SiX_3(OR)$);
germanium-containing gas (e.g., $GeH_4$, $Ge_2H_6$, $GeH_3R$, $GeH_2R_2$, $GeHR_3$, $GeR_4$, $GeF_4$, $GeX_4$);
tin-containing gas (e.g., $SnH_4$, $SnH_3R$, $SnH_2R_2$, $SnHR_3$, $SnR_4$, $SnH_3X$, $SnH_2X_2$, $SnHX_3$, $XSnR_3$, $X_2SnR_2$, $X_3SnR$);
tellurium-containing gas (e.g., $TeH_2$, $TeHR$, $TeR_2$, $TeF_6$);
halide gases (e.g., $F_2$, $Cl_2$, $Br_2$, $I_2$, $SF_4$)
halocarbonyl-containing gas (e.g., $COCl_2$, $COF_2$, $COX_2$, $COF_3$, $CO(CF_3)_2$ (hexafluoroacetone)); and
oxygen-containing gas (e.g., $O_2$, $SO_2F_2$, $SO_2Cl_2$, $SO_2X_2$ provided that if the mixture contains only one chemically reacted gas then the chemically reacted gas is not $CO_2$ or COS).

In the above formulas, the variable R is independently a straight, branched or cyclic alkyl group and the variable X is independently an anion which may include, but is not limited to, a halide atom. In the above chemical formulas and in all chemical formulas throughout this document, it is understood that the variables such as R and X are not only independently selected relative to other R and X groups bearing different superscripts, but are also independently selected relative to any additional species of the same R or X group. For example, in the formula $BXR_2$ the two R groups need not be identical to each other and, in the formula $SeX_6$ the 6 X atoms need not be identical to each other.

At least a portion of the chemically reacted gas, optionally the unreacted gas, or both may be separated from the mixture using a variety of methods and systems. The choice of separation method may vary depending upon the strength of the bond between the chemically reacted portion of the gas and the ionic liquid, the solubility of unreacted portion of the gas if contained within the mixture, or both. Mixtures based on relatively weak bonds, e.g. $\Delta G > -4.5$ kcal/mol, are well suited for sub-atmospheric delivery systems. In these embodiments, the bond between the ionic liquid and at least a portion of the chemically reacted gas can be readily broken thereby allowing the gas or gases to be removable under the conditions of a given process. The gas can be removed, for example, via reduced pressure, addition of heat, or a combination of both. Examples of additional separation methods that may be used alone or in combination to separate at least a portion of the chemically reacted and/or unreacted gases from the mixture include scrubbing, distillation, evaporation, membrane separation, including pervaporation, and extraction.

In certain embodiments, the mixture described herein may be stored within an enclosed storage vessel such as, but not limited to, a gas cylinder with a pressure regulator. At least a portion of the chemically reacted gas, the unreacted gas, or both may be separated from the mixture using a low pressure gas delivery system. In these embodiments, the chemically reacted gas and optionally the unreacted gas may be removed from the mixture by creating a pressure differential. In this or in other embodiments, other known methods for enhancing the removal of at least a portion of chemically reacted and/or unreacted gas can be used such as agitation and liquid aerosolization. One particular example of enhancing the removal of at least a portion of the chemically reacted and/or unreacted gas from the mixture is by introducing an inert gas—such as any of the inert gases defined herein—below the surface of the mixture (e.g., the liquid gas interface) contained within the vessel. The introduction of an inert gas may, for example, promote gas bubble formation which can comprise the desired gas to be delivered allowing the desired gas to be removed from the vessel or reside within the headspace. The foregoing example, which may be used by itself or in conjunction with the establishment of a pressure differential, can make the removal of the desired gas from the mixture from the vessel and/or the head space of the vessel more efficient. In yet another embodiment, the inert gas used to enhance removal of the desired gas can also serve as a carrier to transport the desired gas to a process or point of use. In this embodiment, the inert gas when acting as a carrier gas can be introduced below the liquid/gas interface, directly into the headspace of the vessel containing the gas/ionic liquid mixture, or both.

In yet another embodiment, at least a portion or all of the unreacted gas may be separated from the mixture while retaining the chemically reacted gas within the mixture using a freeze-pump-thaw method. In this regard, the temperature of the mixture containing the chemically reacted gas, ionic liquid, and unreacted gas, is reduced to solidify the ionic liquid mixture such that the physical solubility of the unreacted gas would fall to substantially zero while the chemically reacted gas would remain within the mixture. The unreacted gas can then be readily removed from the mixture while the ionic liquid having the chemically reacted gas disposed therein remains solid. Next, the temperature of the mixture may be increased to liquefy the ionic liquid mixture thereby leaving the mixture containing the chemically reacted gas which is substantially free (i.e., less than 5%, or less than 1%, or less than 0.1% by volume) of unreacted gas.

The mixture described herein is advantageous for separation and extraction applications. Liquid and solid mixtures can be used to separate at least a portion of a chemically reacted gas from the unreacted portion of the gas which could be an additive gas, an inert gas, and/or the unreacted portion of the gas by passing the one or more gases through the reactive ionic liquid or a solution containing the reactive ionic liquid. If the gas-ionic liquid bond of a mixture is sufficiently weak, the reaction may be reversed, e.g. by applying a vacuum and/or heat, allowing the original ionic liquid to be reused and/or allowing the reacted portion of gas to be recovered. The gas can be separated from unreactive or less reactive gases by various means. In other embodiments, a mixture in the liquid phase can be decanted or otherwise removed from another liquid phase (e.g., other unreacted liquids) if the components of the liquid are immiscible with the liquid mixture or a solution containing the mixture. In still another embodiment, the reacted portion of the gas, the unreacted portion of the gas, and/or the ionic liquid can be separated from a solidified component via filtration.

The mixture described herein may comprise additional components which may include, but are not limited to, water, organic solvents, other ionic liquids, and solid supports.

In certain embodiments, some mixtures may be advantageously used as a reaction medium for chemical reactions. In these embodiments, the mixture may be used to provide, for example, a reagent for the chemical reaction which may be the ionic liquid, the chemically reacted portion of the gas, the unreacted portion of the gas, and/or the mixture itself. Some of these may be useful as reaction media for chemical reactions such as Friedel-Craft acylation, polymerization or oligomerization, hydroformylation, hydrogenation, olefin methathesis, and various other organic transformations, especially those requiring a polar aprotic solvent. Some of the mixtures may be useful as recyclable reaction media in which the at least a portion of the gas component of the mixture (reacted and/or unreacted) serves as a catalyst or stoichiometric reactant. In these embodiments, the mixture can be regenerated by purifying the remaining ionic liquid and adding an additional amount of gas.

Certain mixtures may be advantageously used as heat transfer fluids. For example, the separation or evolution of gas from the mixture may result in a temperature drop that can be used, for example, to cool a system.

In certain embodiments, the system for storage and dispensing of one or more chemically-reacted gas, optionally unreacted gas, or both from the mixture comprises a storage and dispensing vessel constructed and arranged to hold the mixture, and for selectively flowing such gas into and out of such vessel. A dispensing assembly is coupled in gas flow communication with the storage and dispensing vessel, and constructed and arranged for selective, on-demand dispensing of the gas by thermal and/or pressure differential-mediated evolution from the reactive liquid-phase medium. The dispensing assembly can be constructed and arranged: (i) to provide, exteriorly of said storage and dispensing vessel, a pressure below said interior pressure, to effect evolution of the gas from the mixture, and flow of gas from the vessel through the dispensing assembly; and/or (ii) to provide means for removal of heat of reaction of at least a portion of the gas with the ionic liquid and for heating the mixture to effect evolution of the gas therefrom, so that the gas flows from the vessel into the dispensing assembly.

In certain embodiments, at least a portion of the gas (e.g., chemically reacted, optionally unreacted, or both) within the mixture is readily removable from the mixture by pressure-mediated and/or thermally-mediated evolution methods. The term "pressure-mediated evolution" describes establishing certain pressure conditions, which typically range from $10^{-1}$ to $10^{-7}$ Torr at 25° C., to cause the gas to evolve from the mixture. For example, such pressure conditions may involve the establishment of a pressure differential between the mixture in the vessel, and the exterior environment of the vessel, which causes flow of at least a portion of the gas from the vessel to the exterior environment (e.g., through a manifold, piping, conduit or other flow region or passage). The pressure conditions effecting gas evolution may involve the imposition on the mixture of vacuum or suction conditions which effect extraction of the chemically reacted portion of the gas and/or unreacted gas from the vessel. The term "thermally-mediated evolution" describes heating the mixture to cause the evolution of at least a portion of the gas (e.g., chemically reacted gas, optionally unreacted gas, or both) from the mixture so that the gas can be withdrawn or discharged from the vessel. Typically, the temperature for thermal-mediated evolution ranges from 30° C. to 150° C.

The mixture may be stored in a vessel that can be gas permeable or non-permeable. In the former embodiments, at least a portion of the gas (e.g., chemically reacted gas, optionally unreacted gas, or both) can gradually evolve from the vessel having the mixture contained therein, over a certain period of time. In the latter embodiments, at least a portion of the gas (e.g., chemically reacted gas, optionally unreacted gas, or both) may evolve from the mixture and occupy any headspace within the non-permeable vessel as the mixture achieves chemical equilibrium.

The mixture and method will be illustrated in more detail with reference to the following examples, but it should be understood that the mixture and method described herein is not deemed to be limited thereto.

EXAMPLES

General Procedure

The following is a general procedure for establishing the effectiveness of ionic liquids for storing and delivering at least one gas in the examples. Unless otherwise stated, phosphene ($PH_3$) and boron trifluoride ($BF_3$) are used as the exemplary gases for the mixture described herein.

In a glove box, a 25 mL or 50 mL stainless steel reactor or glass Schlenk flask was charged with a known quantity of an ionic liquid or ionic liquid solution. The reactor was sealed, brought out of the glove box, and connected to an apparatus comprising a pressurized cylinder of pure $PH_3$ or $BF_3$, a stainless steel ballast, and a vacuum pump vented to a vessel containing a $PH_3$ or $BF_3$ scavenging material. The gas regulator was closed and the experimental apparatus was evacuated up to the regulator. Helium pycnometry was used to measure ballast, piping and reactor headspace volumes for subsequent calculations. The apparatus was again evacuated and closed off to vacuum. The following steps were used to introduce $PH_3$ or $BF_3$ to the reactor in increments: 1) the reactor was isolated by closing a valve leading to the ballast, 2) $PH_3$ or $BF_3$ was added to the ballast (ca. 800 Torr) via a mass flow controller, 3) the reactor valve was opened and the gas pressure was allowed to equilibrate while the reactor contents were stirred. These steps were repeated until the desired equilibrium vapor pressure was obtained. The quantity of $PH_3$ or $BF_3$ added in each increment was measured by pressure and volume difference according to the ideal gas law. The amount of reacted $PH_3$ or $BF_3$ was determined by subtracting tubing and reactor headspace volumes.

Figure 2:
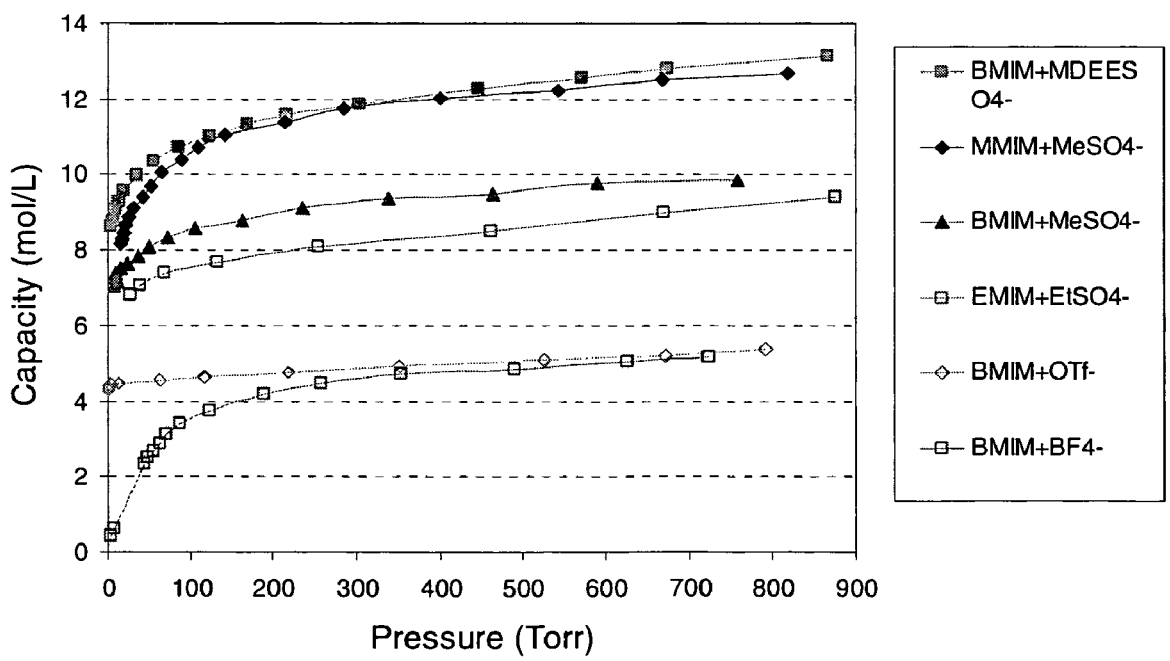
FIG. 2 is a graph of capacity of boron trifluoride ($BF_3$) for various mixtures described herein.

The reacted $PH_3$ or $BF_3$ was removed from the mixture by isolating the reactor, evacuating the ballast, and reopening the reactor to allow the gas to evolve from the liquid and expand into the ballast. This procedure was repeated until a desired lower pressure limit was achieved. The evolved gas was periodically analyzed by mass spectrometry and/or gas chromatography. In all cases the evolved gas was substantially unchanged from the starting gas. FIGS. 1 and 2 provide illustrations of the working capacity for some of the following exemplary mixtures containing $PH_3$ and $BF_3$.

Example 1

Mixture Formed from Reaction of Lewis Acidic Ionic Liquid $BMIM^+Al_2Cl_7^-$ and $PH_3$ Molecular modeling was used to calculate a binding energy, $\Delta E_{rxn}$, for this Lewis acidic ionic liquid with $PH_3$. The ionic liquid was modeled as an ion-pair, using 1,3-dimethylimidazolium as the cation, $Al_2Cl_7^-$ as the anion, and it was assumed that one equivalent of $PH_3$ reacted per equivalent of $Al_2Cl_7^-$ anion (concentration of $Al_2Cl_7^-$=3.2 mol/L). Structures were determined based on minimum energy geometry optimization using Density Functional Theory (DFT) at the BP level with a double numerical (DN**) basis set. This Lewis acidic ionic liquid was calculated to have a $\Delta E_{rxn}$ of 0.71 kcal/mol, which suggests that the reaction is slightly unfavorable, although within the general limitations of error. To clarify the results of modeling, the following reaction was run.

In a glove box, 9.07 g of $AlCl_3$ (2 equivalents) was slowly added to 5.94 g (1 equivalent) of 1-butyl-3-methylimidazolium chloride ($BMIM^+Cl$) (assuming the anion $Al_2Cl_7^-$ is formed from reaction stoichiometry of 2 equivalents $AlCl_3$ to 1 equivalent $BMIM^+Cl^-$). A 25 mL reactor was charged with 4.61 g of BMIM$^+$Al$_2$Cl$_7^-$ (density=1.2 g/mL) and the general procedure for measuring the reaction with PH$_3$ was followed. The ionic liquid reacted with 6.9 mmol of PH$_3$ at room temperature and 776 Torr, corresponding to 1.8 mol PH$_3$/L of ionic liquid.

The results show % reversibility=89%, working capacity=1.6 mol/L (room temperature, 20-760 Torr). The experimental $\Delta G_{rxn}$ is approximately 0 kcal/mol at 25° C. These results show that the ionic liquid BMIM$^+$Al$_2$Cl$_7^-$ is effective as an ionic liquid for PH$_3$ and suitable for reacting to form a mixture and that the $\Delta E_{rxn}$ provides excellent guidance in the selection of a reactive system.

Delivery of the complex formed to storage and delivery system can be effected by pumping the complex to the vessel.

Example 2

Mixture Formed from Reaction of Lewis Acidic Ionic Liquid BMIM$^+$CuCl$_2^-$ and PH$_3$ In a glove box, 3.10 g of CuCl was slowly added to a flask charged with 5.46 g of BMIM$^+$Cl$^-$ (1:1 stoichiometry) (assuming the anion CuCl$_2^-$ is formed from the reaction stoichiometry 1 equivalent CuCl to 1 equivalent BMIM$^+$Cl$^-$). The mixture was stirred overnight and stored. A glass insert was charged with 7.71 g of the ionic liquid (density=1.4 g/mL) and placed into a 50 mL reactor, and the general procedure for measuring PH$_3$ reaction was followed. The Lewis acidic ionic liquid reacted with 7.6 mmol of PH$_3$ at room temperature and 674 Torr, corresponding to 1.4 mol PH$_3$/L of ionic liquid. Equilibrium data points were not obtained and % reversibility and working capacity were not determined.

Example 3

Mixture Formed from Reaction of Lewis Acidic Ionic Liquid BMIM$^+$Cu$_2$Cl$_3^-$ and PH$_3$ Molecular modeling was used to approximate the effectiveness of BMIM$^+$Cu$_2$Cl$_3^-$ as a reactive liquid. The ionic liquid was modeled as an ion-pair, using 1,3-dimethylimidazolium as the cation, Cu$_2$Cl$_3^-$ as the anion, and it was assumed that one equivalent of PH$_3$ reacted with each equivalent of copper (concentration of Cu reactive groups=9.7 mol/L). Structures were determined based on minimum energy geometry optimization using Density Functional Theory (DFT) at the BP level with a double numerical (DN**) basis set. This Lewis acidic ionic liquid was calculated to have an average $\Delta E_{rxn}$ of –5.5 kcal/mol for its reaction with PH$_3$. The results indicate that this ionic liquid should bind PH$_3$ more strongly than BMIM$^+$Al$_2$Cl$_7^-$ of Example 1. Since $\Delta G_{rxn}$ is smaller in magnitude than $\Delta E_{rxn}$ and the optimum $\Delta G_{rxn}$ for the pressure range 20 to 760 Torr at room temperature is ca. –3 kcal/mol, the result suggests that the binding properties of BMIM$^+$Cu$_2$Cl$_3^-$ may be well suited for reversibly reacting with PH$_3$ (i.e., high working capacity and high % reversibility).

In a glove box, 11.6 g of CuCl was slowly added to a round bottom flask charged with 10.2 g of BMIM$^+$Cl$^-$ (2:1 stoichiometry) (assuming the anion Cu$_2$Cl$_3^-$ is formed from the reaction stoichiometry 2 equivalents CuCl to 1 equivalent BMIM$^+$Cl$^-$). The mixture was stirred overnight. A glass-insert was charged with 12.02 g of the ionic liquid (density=1.8 g/mL) and placed into a 50 mL reactor, and the general procedure for measuring PH$_3$ reaction was followed. The ionic liquid reacted with 51 mmol of PH$_3$ at room temperature and 736 Torr, corresponding to 7.6 mol PH$_3$/L of ionic liquid.

The results show % reversibility=84%, working capacity=6.4 mol/L (room temperature, 20-736 Torr). The experimental $\Delta G_{rxn}$ is approximately –0.7 kcal/mol at 22° C.

Example 4

Mixture Formed from Reaction of Lewis Acidic Ionic Liquid EMIM$^+$Cu$_2$Cl$_3^-$ and PH$_3$ In a glove box, 11.49 g of CuCl was slowly added to a glass vial charged with 8.51 g of 1-ethyl-3-methylimidazolium chloride (EMIM$^+$Cl$^-$) (2:1 stoichiometry). (It is assumed the anion Cu$_2$Cl$_3^-$ is formed from the reaction stoichiometry 2 equivalents CuCl to 1 equivalent EMIM$^+$Cl$^-$). The mixture was stirred overnight. A 25 mL reactor was charged with 8.49 g of the ionic liquid (density=1.8 g/mL), and the general procedure for measuring PH$_3$ reaction was followed. The ionic liquid reacted with 35 mmol of PH$_3$ at room temperature and 729 Torr, corresponding to 7.4 mol PH$_3$/L of ionic liquid. Equilibrium data points were not obtained and % reversibility and working capacity were not determined.

Example 5

BMIM$^+$BF$_4^-$, Lewis Base Ionic Liquid For PH$_3$

A 50 mL reactor was charged with 3.99 g of BMIM$^+$BF$_4^-$ and the general procedure for measuring PH$_3$ reaction was followed. The ionic liquid is slightly Lewis basic and it does not react with Lewis basic PH$_3$. The $\Delta G_{rxn}$ reaction is $\geq 0$ kcal/mol

Example 6

BMIM$^+$AlCl$_4^-$, Acid/Base Neutral Ionic Liquid For PH$_3$

A 50 mL reactor was charged with 9.81 g of BMIM$^+$AlCl$_4^-$ formed by adding AlCl$_3$ to BMIM$^+$Cl (1:1 stoichiometry) and the general procedure for measuring PH$_3$ reaction was followed. (It is assumed the anion AlCl$_4^-$ is formed from the reaction stoichiometry 1 equivalent AlCl$_3$ to 1 equivalent BMIM$^+$Cl$^-$). The ionic liquid reacted with 0.44 mmol of PH$_3$, corresponding to about 0.06 mol PH$_3$/L of ionic liquid. The AlCl$_4^-$ anion is not Lewis acidic. It is believed that the small amount of PH$_3$ reaction that was observed was likely due to the presence of a small concentration of Lewis acidic Al$_2$Cl$_7^-$. This example further demonstrates that a Lewis acidic species is required for reaction with PH$_3$.

Example 7

Mixture Formed from Reaction of Lewis Basic Ionic Liquid BMIM$^+$BF$_4^-$ and BF$_3$ Molecular modeling was used to approximate the effectiveness of BMIM$^+$BF$_4^-$ as a reactive liquid for the chemical complexation of BF$_3$. Using Spartan SGI Version 5.1.3, the ionic liquid was modeled as an ion-pair, using 1,3-dimethylimidazolium as the cation, and it was assumed that one equivalent of BF$_3$ reacted with the anion from each equivalent of BMIM$^+$BF$_4^-$ (concentration of BF$_4^-$ reactive groups=5.4 mol/L). Structures were determined based on minimum energy geometry optimization using Density Functional Theory (DFT) at the BP level with a double numerical (DN**) basis set. This Lewis basic ionic liquid was calculated to have a $\Delta E_{rxn}$ of –5.5 kcal/mol for its reaction with BF$_3$.

The modeling results indicate that the binding affinity of this ionic liquid for $BF_3$ should be similar to the binding affinity between $BMIM^+Cu_2Cl_3^-$ and $PH_3$ in Example 3 where $\Delta E_{rxn}$ also is calculated to be −5.5 kcal/mol. Since the reversible reaction between the Lewis acidic $BMIM^+Cu_2Cl_3^-$ and Lewis basic $PH_3$ provides a near optimum working capacity, the result suggests that the binding properties of the Lewis basic $BMIM^+BF_4^-$ may be well suited for reversibly reacting with Lewis acidic $BF_3$ (i.e. high working capacity and high % reversibility).

In a glove box, a 25 mL stainless steel reactor was charged with 8.82 g of $BMIM^+BF_4^-$ purchased from Fluka (density=1.2 g/mL), and the general procedure for measuring $BF_3$ reaction was followed. The ionic liquid reacted with 38.4 mmol of $BF_3$ at room temperature and 724 Torr, corresponding to 5.2 mol $BF_3$/L of ionic liquid.

The results show % reversibility=70%, working capacity=3.6 mol/L (room temperature, 20-724 Torr). The experimental $\Delta G_{rxn}$ is −1.6 kcal/mol at 22° C. As predicted by molecular modeling, the reaction between $BMIM^+BF_4^-$ and $BF_3$ behaved similarly to the reaction between $BMIM^+Cu_2Cl_3^-$ and $PH_3$.

Example 8

Mixture Formed from Reaction of Lewis Basic Ionic Liquid $BMIM^+CH_3OCH_2CH_2OCH_2CH_2O_3SO^-$ ($BMIM^+MDEESO4^-$) Containing an Ether-Functionalized (Task Specific) Anion and $BF_3$ In a glove box, a 25 mL Schlenk flask was charged with 1.96 g of $BMIM^+CH_3OCH_2CH_2OCH_2CH_2O_3SO^-$ from Fluka (density=1.19 g/mL), and the general procedure for measuring $BF_3$ reaction was followed. The ionic liquid reacted with 21.6 mmol of $BF_3$ at room temperature and 864 Torr, corresponding to 13.1 mol $BF_3$/L of ionic liquid. This is consistent with four equivalents of $BF_3$ reacting with each equivalent of ionic liquid.

The results show % reversibility=26%, working capacity=3.36 mol/L (room temperature, 20-760 Torr). It is assumed that the first equivalent of $BF_3$ reacts with the sulfate ($ROSO_2O^-$) anion. The sulfate reaction is irreversible at room temperature and gives a new borate anion, $BF_3(OSO_2OR)^-$, that forms a new ionic liquid with $BMIM^+$.

Example 9

Mixture Formed from Reaction of Lewis Basic Ionic Liquid $BMIM^+OTf^-$ and $BF_3$ In a glove box, a 25 mL Schlenk flask was charged with 4.11 g of $BMIM^+OTf^-$ ($OTf^-=CF_3SO_2O^-$) from Acros (density=1.30 g/mL), and the general procedure for measuring $BF_3$ reaction was followed. The ionic liquid reacted with 17.0 mmol of $BF_3$ at room temperature and 793 Torr, corresponding to 5.4 mol $BF_3$/L of ionic liquid. This is consistent with complete reaction of one mole of $BF_3$ per mole of ionic liquid and partial reaction of a second equivalent of $BF_3$.

The results show % reversibility=16%, working capacity=0.85 mol/L (room temperature, 20-760 Torr). It is assumed that the first equivalent of $BF_3$ reacts with the triflate anion. The triflate reaction is irreversible at room temperature and gives a borate anion, $BF_3(OSO_2CF_3)^-$ that forms a new ionic liquid with $BMIM^+$ Example 10

Mixture Formed from Reaction of Lewis Basic Ionic Liquid $BMIM^+MeSO_4^-$ and $BF_3$ In a glove box, a 25 mL Schlenk flask was charged with 4.16 g of $BMIM^+MeSO_4^-$ ($MeSO_4^-=CH_3OSO_2O^-$) from Fluka (density=1.21 g/mL), and the general procedure for measuring $BF_3$ reaction was followed. The ionic liquid reacted with 33.9 mmol of $BF_3$ at room temperature and 757 Torr, corresponding to 9.86 mol $BF_3$/L of ionic liquid. This is consistent with complete reaction of one mole of $BF_3$ per mole of ionic liquid and partial reaction of a second equivalent of $BF_3$.

The results show % reversibility=23%, working capacity=2.24 mol/L (room temperature, 20-757 Torr). It is assumed that the first equivalent of $BF_3$ reacts with the sulfate ($MeOSO_2O^-$) anion. The sulfate reaction is irreversible at room temperature and gives a borate anion, $BF_3(OSO_2OCH_3)^-$, that forms a new ionic liquid with $BMIM^+$ Example 11

Mixture Formed from Reaction of Lewis Basic Ionic Liquid $MMIM^+MeSo_4^-$ Supplied as a Room Temperature Liquid and $BF_3$ In a glove box, a 25 mL Schlenk flask was charged with 4.07 g of $MMIM^+MeSO_4^-$ (1,3-dimethylimidazolium methylsulfate) supplied as a liquid at room temperature from Fluka (density=1.33 g/mL), and the general procedure for measuring $BF_3$ reaction was followed. The ionic liquid reacted with 38.9 mmol of $BF_3$ at room temperature and 817 Torr, corresponding to 12.7 mol $BF_3$/L of ionic liquid. This is consistent with complete reaction of one mole of $BF_3$ per mole of ionic liquid and partial reaction of a second equivalent of $BF_3$.

The results show % reversibility=32%, working capacity=4.03 mol/L (room temperature, 20-760 Torr). It is assumed that the first equivalent of $BF_3$ reacts with the sulfate ($MeOSO_2O^-$) anion. The sulfate reaction is irreversible at room temperature and gives a borate anion, $BF_3(OSO_2OCH_3)^-$, that forms a new ionic liquid with $MMIM^+$.

Example 12

Mixture formed from reaction of Lewis Basic Ionic Liquid $MMIM^+MeSO_4^-$ Supplied as a Room Temperature Solid and $BF_3$ Pure $MMIM^+MeSO_4^-$ ionic liquid is a solid at room temperature, however, the material used in Example 11 was a liquid at room temperature, indicating that the sample was impure. The experiment from Example 11 was repeated using a higher purity ionic liquid.

In a glove box, a 25 mL Schlenk flask was charged with 6.39 g of $MMIM^+MeSO_4^-$ (1,3-dimethylimidazolium methylsulfate) supplied as a solid at room temperature from Solvent Innovation (density assumed to be 1.33 g/mL, see example 11), and the general procedure for measuring $BF_3$ reaction was followed. The ionic liquid immediately reacted with $BF_3$ to give a liquid mixture. The ionic liquid reacted with 62.1 mmol of $BF_3$ at room temperature and 757 Torr, corresponding to 12.9 mol $BF_3$/L of ionic liquid. The result indicates that the ionic liquid reacts with $BF_3$ to about the same extent whether the ionic liquid is used as an impure liquid or as a solid of higher purity.

Example 13

Mixture Formed from Reaction of Lewis Basic Ionic Liquid $EMIM^+EtSO_4^-$ and $BF_3$ In a glove box, a 25 mL Schlenk flask was charged with 4.18 g of $EMIM^+EtSO_4^-$ (1-ethyl-3-methylimidazolium ethylsulfate) from Solvent Innovation (density=1.21 g/mL), and the general procedure for measuring $BF_3$ reaction was followed. The ionic liquid reacted with 32.5 mmol of $BF_3$ at room temperature and 757 Torr, corresponding to 9.42 mol $BF_3$/L of ionic liquid. This is consistent with complete reaction of one mole of $BF_3$ per mole of ionic liquid and partial reaction of a second equivalent of $BF_3$.

The results show % reversibility=25%, working capacity=2.36 mol/L (room temperature, 26-757 Torr). It is assumed that the first equivalent of $BF_3$ reacts with the sulfate ($EtOSO_2^-$) anion. The sulfate reaction is irreversible at room temperature and gives a borate anion, $BF_3(OSO_2OCH_2CH_3)^-$, that forms a new ionic liquid with $EMIM^+$.

Example 14

Mixture Formed from Reaction of Lewis Basic Ionic Liquid 1-(3-cyanopropyl)-3-methylimidazolium tetrafluoroborate (($C_3CN)MIM^+BF_4^-$) containing a nitrile-functionalized (task specific) cation and $BF_3$ In a glove box, a 25 mL Schlenk flask was charged with 2.11 g of $(C_3CN)MIM^+BF_4^-$ (density=1.87 g/mL), and the general procedure for measuring $BF_3$ reaction was followed. The ionic liquid reacted with 9.75 mmol of $BF_3$ at room temperature and 69 Torr, corresponding to 8.64 mol $BF_3$/L of ionic liquid. This is consistent with more than one equivalent of $BF_3$ reacting with each equivalent of ionic liquid.

It is assumed that $BF_3$ reacts with the $BF_4^-$ anion as well as the nitrile group of the functionalized imidazolium cation. In this case, the full theoretical capacity is 15.8 mol/L (7.89 mol of ionic liquid/L). The mixture became too viscous to stir after adding 8.64 mmol of $BF_3$. The reacted $BF_3$ was removed under vacuum both at room temperature and with external heating, and the viscosity of the liquid decreased as $BF_3$ was removed.

Example 15

Mixture Formed from Reaction of Lewis Basic Ionic Liquid $BMIM^+BF_4^-$, Lewis Basic Ionic Liquid 1-(3-cyanopropyl)-3-methylimidazolium tetrafluoroborate (($C_3CN)MIM^+BF_4^-$) Containing a Nitrile-Functionalized (Task Specific) Cation, and $BF_3$ A solution comprising $(C_3CN)MIM^+BF_4^-$ and $BMIM^+BF_4^-$ was prepared to decrease the viscosity of the mixture resulting from the reaction of $BF_3$ with $(C_3CN)MIM^+BF_4^-$. In a glove box, a 25 mL Schlenk flask was charged with 1.97 g of $(C_3CN)MIM^+BF_4^-$ (density=1.87 g/mL, volume=1.05 mL) and 1.33 g of $BMIM^+BF_4^-$ (density=1.21 g/mL, volume 1.10 mL). The two liquids were stirred together to make a solution (estimated density=1.53 g/mL) and the general procedure for measuring $BF_3$ reaction was followed. The ionic liquid solution reacted with 19.7 mmol of $BF_3$ at room temperature and 813 Torr, corresponding to 9.12 mol $BF_3$/L of ionic liquid solution.

It is assumed that $BF_3$ reacts with the $BF_4^-$ anions from both ionic liquids as well as the nitrile group of the functionalized imidazolium cation. In this case, the full theoretical capacity is 10.45 mol/L (7.72 mol/L for $(C_3CN)MIM^+BF_4^-$, 2.76 mol/L for $BMIM^+BF_4^-$). The mixture became slightly cloudy, consistent with a high loading of $BF_3$, but retained a low enough viscosity to allow stirring. At least a portion of the reacted $BF_3$ was removable under vacuum at room temperature.

Example 16

Mixture Formed from the Contact of Lewis Acidic Ionic Liquid 1-butyl-3-methylimidazolium trichloridicuprate ($BMIM^+Cu_2Cl_3^-$) with at Least a Portion of Phosphine ($PH_3$) Chemically Reacted with the Ionic Liquid and Unreacted Gases Nitrogen and Carbon Monoxide; Removal of Nitrogen and Carbon Monoxide from the Resulting Mixture A 2.2 liter vessel was charged with 1.07 liters of $BMIM^+Cu_2Cl_3^-$. The vessel was placed under vacuum and the ionic liquid was degassed with mixing overnight. Phosphine containing trace levels of nitrogen and carbon monoxide was introduced into the vessel through a tube below the surface of the ionic liquid with mixing. The flow of $PH_3$ was stopped after adding about 250 g of $PH_3$ and the pressure above the ionic liquid (vessel headspace) equilibrated to 690 Torr. At least a portion of the $PH_3$ was chemically reacted with the $BMIM^+Cu_2Cl_3^-$ to provide a mixture. Gas chromatography was used to analyze the approximately 1 liter of gas contained in the vessel headspace. In addition to $PH_3$, the headspace contained 89 parts per million (ppm) of nitrogen, 3 ppm of carbon monoxide, and about 1% by volume hydrogen. The approximately 1 liter volume of gas was removed from the headspace and mixture by exposing the vessel to an evacuated 500 mL ballast a total of 10 times. The headspace was sampled upon reaching a pressure of 630 Torr and was found to contain, in addition to $PH_3$, 4.8 ppm of nitrogen, 0.74 ppm of carbon monoxide; and less than ½% by volume hydrogen. Upon standing for three days, the pressure within the vessel equilibrated to 680 Torr and the approximately 1 liter of gas in the headspace contained 17.7 ppm of nitrogen, 1.1 ppm of carbon monoxide, and less then ½% by volume hydrogen. Gas was removed from the headspace and mixture by exposing the vessel to an evacuated 500 mL flask (11 times), which reduced the levels of nitrogen and carbon monoxide to 0.6 ppm and 0.18 ppm, respectively. Most of the remaining gas comprised $PH_3$ with less than ½% by volume of hydrogen.

The invention claimed is:

1. A mixture for storage and delivery of a gas comprising:
   an ionic liquid comprising an anion and a cation;
   the gas disposed within the ionic liquid comprising at least one selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, and an oxygen-containing gas wherein at least a portion of the gas is reversibly chemically reacted in a chemical reaction with the ionic liquid to provide a chemically reacted gas provided that the chemical reaction is chosen from a metallic substitution reaction or a metallic oxidative addition reaction; and an unreacted gas selected from an additive gas, an inert gas, an unreacted portion of the chemically reacted gas, and mixtures thereof.

2. The mixture of claim 1 wherein the chemically reacted gas comprises at least one gas selected from the group consisting of phosphine, arsine, stibine, ammonia, hydrogen selenide, hydrogen telluride, phosgene, nitrogen, oxygen, and isotopically-enriched analogs of the at least one gas.

3. The mixture of claim 1 wherein the unreacted gas comprises the additive gas selected from carbon monoxide, carbon dioxide, oxygen, and mixtures thereof.

4. The mixture of claim 1 wherein the unreacted gas comprises the inert gas selected from nitrogen, helium, neon, hydrogen, methane, argon, krypton, xenon, radon, and mixtures thereof.

5. The mixture of claim 1 wherein the unreacted gas comprises the unreacted portion of the chemically reacted gas and is at least one gas selected from the group consisting of phosphine, arsine, stibine, ammonia, hydrogen selenide, hydrogen telluride, phosgene, and isotopically-enriched analogs of the at least one gas.

6. The mixture of claim 1 wherein the unreacted gas comprises the unreacted portion of the chemically reacted gas and is at least one gas selected from the group consisting of boron trifluoride, borane, diborane, and isotopically-enriched analogs of the at least one gas.

7. A mixture for the storage and delivery of at least one gas: comprising an ionic liquid having Lewis acidity and comprising a dialkyl-imidazolium cation and a chlorocuprate or chloroaluminate anion; at least one gas having Lewis basicity that is disposed within the ionic liquid and wherein at least a portion of the at least one gas is reversibly chemically reacted with the ionic liquid to provide a chemically reacted gas; and an unreacted gas comprising at least one selected from an additive gas, an inert gas, and mixtures thereof.

8. The mixture of claim 7 wherein the dialkylimidazolium cation is 1-butyl-3-methylimidazolium and said anion is selected from the $Al_2Cl_7^-$, $CuCl_2^-$, and $Cu_2Cl_3^-$.

9. A mixture for storage and delivery of a gas comprising:
an ionic liquid having Lewis basicity and comprising an anion selected from $BF_4^-$, $p\text{-}CH_3\text{-}C_6H_4SO_3^-$, $CF_3SO_3^-$, $(CF_3SO_2)_2N^-$, $(NC)_2N^-$, $(CF_3SO_2)_3C^-$, $CH_3COO^-$ and $CF_3COO^-$ and a cation selected from tetraalkylphosphonium, tetraalkylammonium, N-alkylpyridinium, and 1,3-dialkylimidazolium;

the gas wherein at least a portion of the gas is reversibly chemically reacted with the ionic liquid to provide a chemically reacted gas wherein the chemically reacted gas has Lewis acidity and is selected from borane, diborane, boron trifluoride, boron trichloride, phosphorous trifluoride, phosphorous tetrafluoride, phosphorous pentafluoride, silicon tetrafluoride, arsenic pentafluoride, antimony pentafluoride, germane, germanium tetrafluoride, hydrogen cyanide, isotopically-enriched analogs, and mixtures thereof; and an unreacted gas comprising at least one selected from an additive gas, an inert gas, and mixtures thereof.

10. The mixture of claim 9 wherein the unreacted gas comprises an additive gas selected from carbon monoxide, carbon dioxide, oxygen, and mixtures thereof.

11. The mixture of claim 9 wherein the unreacted gas comprises an inert gas selected from nitrogen, helium, neon, hydrogen, argon, krypton, xenon, radon, and mixtures thereof.

12. The mixture of claim 9 wherein the unreacted gas comprises an unreacted portion of the chemically reacted gas selected from borane, diborane, boron trifluoride, boron trichloride, phosphorous trifluoride, phosphorous tetrafluoride, phosphorous pentafluoride, arsenic pentafluoride, antimony pentafluoride, silicon tetrafluoride, germane, germanium tetrafluoride, hydrogen cyanide, isotopically-enriched analogs, and mixtures thereof.

13. The mixture of claim 9 wherein the ionic liquid has a cation component selected from 1-butyl-3-methylimidazolium, 1-ethyl-3-methylimidazolium, 1-hexyl-3-methylimidazolium, 1-butyl-2,3-dimethylimidazolium, N-hexylpyridinium, 1-butyl-1-methylpyrrolidinium, triheyxyl(tetradecyl)phosphonium, methyl(trioctyl)ammonium, 1-alkyl-3-(3-cyanopropyl)imidazolium, 1-methoxyethyl-3-methylimidazolium, and (S)-4-iospropyl-2-ethyl-3-methyl-4,5-dihydrooxazol-3-ium, and an anion component selected from $BF_4^-$, $PF_6^-$, $AsF_6^-$, and $SbF_6^-$.

14. A method for the storage and delivery of a gas selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, an oxygen-containing gas and mixtures thereof, the method comprising the steps of:

providing an ionic liquid comprising an anion and a cation;
reacting at least a portion of the gas with the ionic liquid to provide a mixture comprising an ionic liquid and a chemically reacted gas;
introducing an unreacted gas comprising an inert gas into the mixture; and
separating at least a portion of the chemically reacted gas and optionally the unreacted gas from the mixture where the chemically reacted gas after the separating step has substantially the same chemical identity as the chemically reacted gas prior to the reacting step.

15. The method of claim 14, wherein the ionic liquid comprises a Lewis base and the gas comprises a Lewis acid.

16. The method of claim 15 wherein the anion of the ionic liquid comprises at least one selected from $BF_4^-$, $CF_3SO_3^-$, $FSO_3^-$, $Cl^-$, $ClO_4^-$, $CH_3CO_2^-$, $(CF_3SO_2)_2N^-$, $B(CN)_4^-$, $CH_3SO_4^-$, and 2-(2-ethoxy)ethylsulfate, and (S)-lactate.

17. The method of claim 15 wherein the cation of the ionic liquid comprises at least one selected from 1-butyl-3-methylimidazolium, 1-ethyl-3-methylimidazolium, 1 -hexyl-3-methylimidazolium, 1 -butyl-2,3-dimethylimidazolium, N-hexylpyridinium, 1 -butyl-1 -methylpyrrolidinium, triheyxyl(tetradecyl)phosphonium, methyl(trioctyl)ammonium, 1 -alkyl-3-(3-cyanopropyl)imidazolium, 1 -methoxyethyl-3-methylimidazolium, and (S)-4-iospropyl-2-ethyl-3-methyl-4,5-dihydrooxazol-3-ium.

18. The method of claim 14 wherein the anion, the cation, or both comprises a reactive functional group.

19. The method of claim 14 wherein the anion, the cation, or both comprises a chiral center.

20. A method for the removal of at least a portion of an unreacted gas from a mixture comprising a chemically reacted gas, an ionic liquid, and the unreacted gas, the method comprising:

providing the ionic liquid comprising an anion and a cation within a storage vessel;

introducing the unreacted gas to the storage vessel comprising the ionic liquid wherein at least a portion of the unreacted gas resides within a headspace of the storage vessel;

reacting at least a portion of a gas selected from the group consisting of a boron-containing gas, an aluminum-containing gas, a phosphorous-containing gas, an arsenic-containing gas, an ether-containing gas, a nitrogen-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, a halocarbonyl-containing gas, an oxygen-containing gas and mixtures thereof with the ionic liquid to provide the mixture comprising the ionic liquid, a chemically reacted gas disposed within the ionic liquid, and the unreacted gas;

reducing the temperature of the mixture to solidify the ionic liquid and provide a solidified mixture comprising the ionic liquid and chemically reacted gas wherein the reducing decreases the solubility of the unreacted gas thereby causing the unreacted gas to evolve into the headspace;

removing substantially all of the unreacted gas from the headspace; and increasing the temperature of solidified mixture to provide a mixture substantially free of unreacted gas.

21. A mixture for storage and delivery of a gas comprising:

an ionic liquid having Lewis basicity and comprising an anion selected from $BF_4^-$, $p$-$CH_3$-$C_6H_4SO_3^-$, $CF_3SO_3^-$, $(CF_3SO_2)_2N^-$, $(NC)_2N^-$, $(CF_3SO_2)_3C^-$, $CH_3COO^-$ and $CF_3COO^-$ and a cation selected from tetraalkylphosphonium, tetraalkylammonium, N-alkylpyridinium, and 1,3-dialkylimidazolium;

the gas wherein at least a portion of the gas is reversibly chemically reacted with the ionic liquid to provide a chemically reacted gas wherein the chemically reacted gas has Lewis acidity and is selected from diborane, boron trifluoride, boron trichloride, phosphorous trifluoride, phosphorous tetrafluoride, phosphorous pentafluoride, silicon tetrafluoride, arsenic pentafluoride, antimony pentafluoride, germane, germanium tetrafluoride, hydrogen cyanide, isotopically-enriched analogs, and mixtures thereof; and an unreacted gas selected from an additive gas, an inert gas, and mixtures thereof.

22. A mixture for storage and delivery of a gas comprising:

an ionic liquid comprising an anion and a cation;

the gas disposed within the ionic liquid comprising at least one selected from the group consisting of a boron-containing gas, an aluminum-containing gas, a phosphorous-containing gas, an arsenic-containing gas, an ether-containing gas, an antimony-containing gas, a bismuth-containing gas, a selenium-containing gas, a gallium-containing gas, a silicon-containing gas, a germanium-containing gas, a tin-containing gas, a tellurium-containing gas, a halogen-containing gas, and a halocarbonyl-containing gas wherein at least a portion of the gas is reversibly chemically reacted in a chemical reaction provided that the chemical reaction is chosen from a metallic substitution reaction or a metallic oxidative addition reaction with the ionic liquid to provide a chemically reacted gas; and optionally an unreacted gas selected from an additive gas, an inert gas, an unreacted portion of the chemically reacted gas, and mixtures thereof.

* * * * *